(12) United States Patent
Kelley et al.

(10) Patent No.: US 8,471,854 B2
(45) Date of Patent: *Jun. 25, 2013

(54) GEOSPATIAL MODELING SYSTEM PROVIDING USER-SELECTABLE BUILDING SHAPE OPTIONS AND RELATED METHODS

(75) Inventors: Patrick Kelley, Palm Bay, FL (US);
Mark Rahmes, Melbourne, FL (US);
Stephen Connetti, Melbourne, FL (US);
Harlan Yates, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 1289 days.

This patent is subject to a terminal disclaimer.

(21) Appl. No.: 11/863,406

(22) Filed: Sep. 28, 2007

(65) Prior Publication Data

US 2009/0085915 A1    Apr. 2, 2009

(51) Int. Cl.
| | |
|---|---|
| G06T 15/10 | (2011.01) |
| G06T 15/00 | (2011.01) |
| G06T 15/40 | (2011.01) |
| G06T 11/20 | (2006.01) |
| G06F 17/50 | (2006.01) |

(52) U.S. Cl.
USPC ........... 345/427; 345/419; 345/421; 345/428; 345/440; 345/441; 703/1

(58) Field of Classification Search
None
See application file for complete search history.

(56) References Cited

U.S. PATENT DOCUMENTS

| | | | |
|---|---|---|---|
| 6,654,690 B2 | 11/2003 | Rahmes et al. | 705/5 |
| 6,748,121 B2 | 6/2004 | Kim et al. | 382/300 |
| 6,987,520 B2 | 1/2006 | Criminisi et al. | 345/629 |
| 2003/0184545 A1 | 10/2003 | Ohto | |
| 2008/0077364 A1* | 3/2008 | Wakelam et al. | 703/1 |

FOREIGN PATENT DOCUMENTS

| | | |
|---|---|---|
| EP | 1107188 | 12/2008 |
| WO | WO2007027847 | 3/2007 |

OTHER PUBLICATIONS

Latarge et al , "Structural Approach for Building Reconstruction from a Single DSM", Journal of Latex Class Files, vol. 6, No. 1, Jan. 2007, pp. 1-14, http://certis.enpc.fr/publications/papers/TPAMI09.pdf.*
Gousie, M. B. *Digital Elevation Model Error Detection and Visualization*, The 4th Workshop on Dynamic & Multi-dimensional GIS (Pontypridd, Wales, UK, 2005), C. Gold, Ed., ISPRS, pp. 42-46.
Grohman at al., *Filling SRTM Voids: The Delta Surface Fill Model*, Photogrammetric Engineering and Remote Sensing, Mar. 2006, pp. 213-216.

(Continued)

*Primary Examiner* — Tize Ma
(74) *Attorney, Agent, or Firm* — Allen, Dyer, Doppelt, Milbrath & Gilchrist, P.A.

(57) ABSTRACT

A geospatial modeling system may include a geospatial model data storage device, a user input device, and a display. A processor may be included for cooperating with the geospatial model data storage device, the user input device and the display for displaying a geospatial model data set on the display including at least one group of building data points, and displaying a plurality of user-selectable different building shapes on the display based upon the at least one group of building data points. The plurality of user-selectable different building shapes may have different respective feature detail levels. The processor may further replace the at least one group of building data points with a given one of the user-selectable different building shapes based upon user selection thereof with the user input device.

24 Claims, 15 Drawing Sheets

OTHER PUBLICATIONS

Criminisi et al., *Region Filling Object Removal by Exemplar-Based Image Inpainting*, IEEE Transactions on Image Processing, vol. 13, No. 9, Sep. 2004.

Gooch at al., *Failure Prediction in Automatically Generated Digital Elevation Models*, Special issue on GeoComp 99- GeoComputation and the Geosciences, vol. 27, Issue 8, Oct. 2001, pp. 913-920.

Ulm et al: "Improved 3D City Modeling with Cybercity Modeler (CC-Modeler) using Aerial-, Satellite Imagery and Laserscanner Data" International Archives of Photogrammetry, Remote Sensing and Spatial Information Sciences, Ondon, vol. 34, Feb. 24, 2003, pp. 1-6.

Armin Gruen: "Tobago—A Semi-Automated Approach for the Generation of 3-D Building Models", ISPRS Journal of Photogrammetry and Remote Sensing, vol. 53, No. 2, Apr. 1998 pp. 108-118.

Guskov I et al: "Hybrid Meshes: Multiresolution Using Regular and Irregular Refinement", Proceedings of the Annual Symposium on Computational Geometry 2002 Association for Computing Machinery US, 2002, pp. 264-272.

Jan Bohm, Norbert Haala: "Efficient Integration of Aerial and Terrestrial Laser Data for Virtual City Modeling using Lasermaps", Proceedings of the ISPRS Workshop Laser Scanning 2005, [Online] vol. XXXVI, No. 3/W19, Sep. 14, 2005, pp. 192-197.

Armin Gruen and Xinhua Wang: "Urban Data Management with a Hybrid 3-D GIS", UDMS'99 "21 ST Urban Data Management Symposium", [Online] Apr. 1999, XP002507267 Venice, Italy Retrieved from the Internet: URL:http://www.photogrammetry.ethz.ch/general/persons/AG_pub/urban_data_Venice_1999.pdf> [retrieved on Dec. 1, 2008], pp. 1-12.

\* cited by examiner

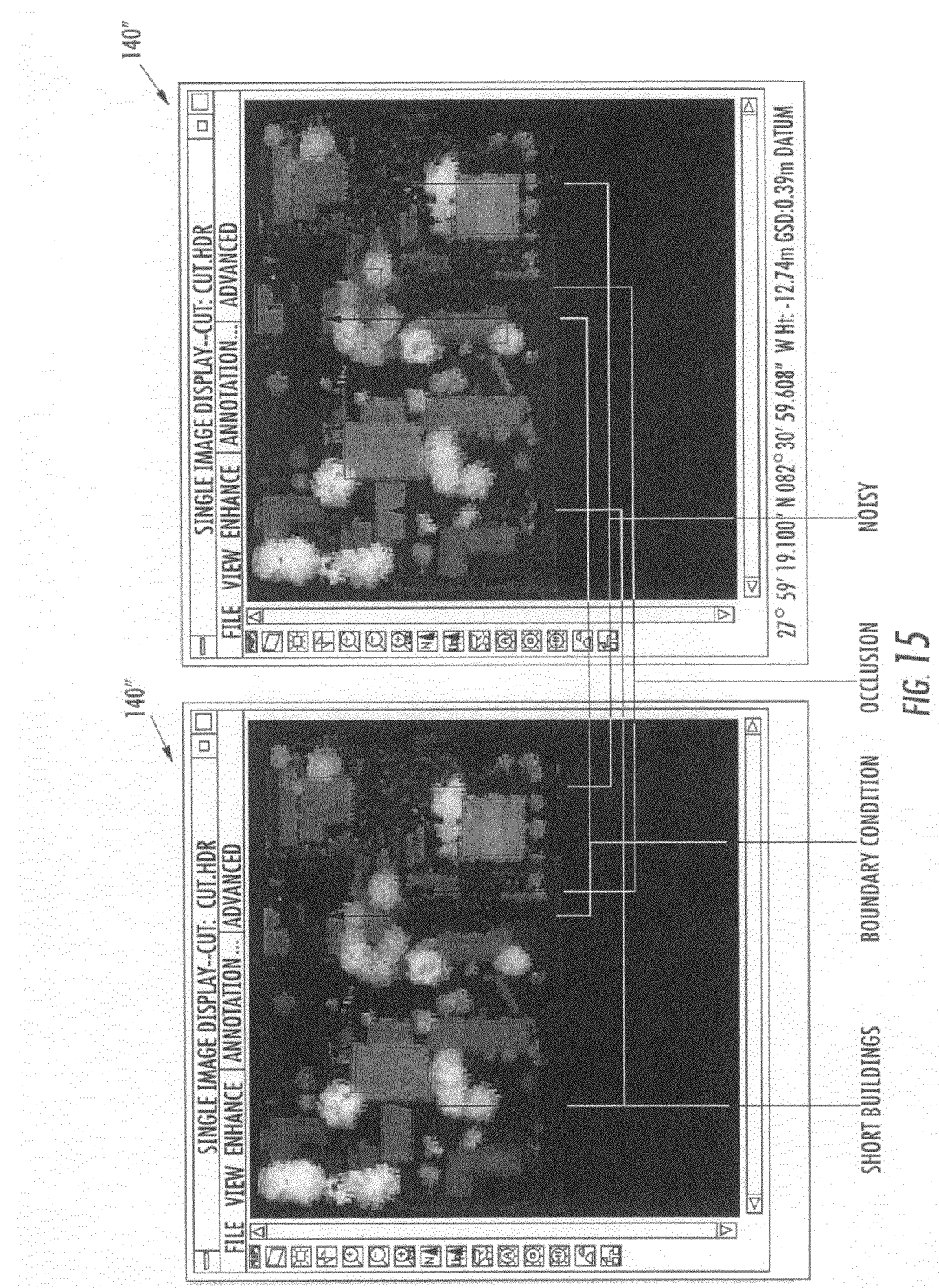

GEOSPATIAL MODELING SYSTEM PROVIDING USER-SELECTABLE BUILDING SHAPE OPTIONS AND RELATED METHODS

FIELD OF THE INVENTION

The present invention relates to the field of data modeling, and, more particularly, to modeling systems such as geospatial modeling systems and related methods.

BACKGROUND OF THE INVENTION

Topographical models of geographical areas may be used for many applications. For example, topographical models may be used in flight simulators and for planning military missions. Furthermore, topographical models of man-made structures (e.g., cities) may be extremely helpful in applications such as cellular antenna placement, urban planning, disaster preparedness and analysis, and mapping, for example.

Various types and methods for making topographical models are presently being used. One common topographical model is the digital elevation map (DEM). A DEM is a sampled matrix representation of a geographical area which may be generated in an automated fashion by a computer. In a DEM, coordinate points are made to correspond with a height value. DEMs are typically used for modeling terrain where the transitions between different elevations (e.g., valleys, mountains, etc.) are generally smooth from one to a next. That is, DEMs typically model terrain as a plurality of curved surfaces and any discontinuities therebetween are thus "smoothed" over. Thus, in a typical DEN no distinct objects are present on the terrain.

One particularly advantageous 3D site modeling product is RealSite® from the present Assignee Harris Corp. RealSite® may be used to register overlapping images of a geographical area of interest, and extract high resolution DEMs using stereo and nadir view techniques. RealSite® provides a semi-automated process for making three-dimensional (3D) topographical models of geographical areas, including cities, that have accurate textures and structure boundaries. Moreover, RealSite® models are geospatially accurate. That is, the location of any given point within the model corresponds to an actual location in the geographical area with very high accuracy. The data used to generate RealSite® models may include aerial and satellite photography, electro-optical, infrared, and light detection and ranging (LIDAR), for example.

Another similar system from Harris Corp. is LiteSite®. LiteSite® models provide automatic extraction of ground, foliage, and urban digital elevation models (DEMs) from LIDAR and IFSAR imagery. LiteSite™ can be used to produce affordable, geospatially accurate, high-resolution 3-D models of buildings and terrain.

U.S. Pat. No. 6,654,690 to Rahmes et al., which is also assigned to the present Assignee and is hereby incorporated herein in its entirety by reference, discloses an automated method for making a topographical model of an area including terrain and buildings thereon based upon randomly spaced data of elevation versus position. The method includes processing the randomly spaced data to generate gridded data of elevation versus position conforming to a predetermined position grid, processing the gridded data to distinguish building data from terrain data, and performing polygon extraction for the building data to make the topographical model of the area including terrain and buildings thereon.

In many instances there will be voids or gaps in the data used to generate a geospatial or other model. The voids negatively affect the quality of the resulting model, and thus it is desirable to compensate for these voids while processing the data, if possible. Various interpolation techniques are generally used for filling in missing data in a data field. One such technique is sinc interpolation, which assumes that a signal is band-limited. While this approach is well suited for communication and audio signals, it may not be well suited for 3D data models. Another approach is polynomial interpolation. This approach is sometimes difficult to implement because the computational overhead may become overly burdensome for higher order polynomials, which may be necessary to provide desired accuracy.

One additional interpolation approach is spline interpolation. While this approach may provide a relatively high reconstruction accuracy, this approach may be problematic to implement in a 3D data model because of the difficulty in solving a global spline over the entire model, and because the required matrices may be ill-conditioned. One further drawback of such conventional techniques is that they tend to blur edge content, which may be a significant problem in a 3D topographical model.

Another approach for filling in regions within an image is set forth in U.S. Pat. No. 6,987,520 to Criminisi et al. This patent discloses an exemplar-based filling system which identifies appropriate filling material to replace a destination region in an image and fills the destination region using this material. This is done to alleviate or minimize the amount of manual editing required to fill a destination region in an image. Tiles of image data are "borrowed" from the proximity of the destination region or some other source to generate new image data to fill in the region. Destination regions may be designated by user input (e.g., selection of an image region by a user) or by other means (e.g., specification of a color or feature to be replaced). In addition, the order in which the destination region is filled by example tiles may be configured to emphasize the continuity of linear structures and composite textures using a type of isophote-driven image-sampling process.

With respect to geospatial models such as DEMs, various approaches have been attempted to address error recognition and correction due to voids, etc. One such approach is set forth in an article by Gousie entitled "Digital Elevation Model Error Detection and Visualization," 4th ISPRS Workshop on Dynamic & Multi-dimensional GIS (Pontypridd, Wales, UK, 2005), C. Gold, Ed., pp. 42-46. This paper presents two methods for visualizing errors in a DEM. One method begins with a root mean square error (RMSE) and then highlights areas in the DEM that contain errors beyond a threshold. A second method computes local curvature and displays discrepancies in the DEM. The visualization methods are in three dimensions and are dynamic, giving the viewer the option of rotating the surface to inspect any portion at any angle.

Another example is set forth in an article by Grohman et al. entitled "Filling SRTM Voids: The Delta Surface Fill Method," Photogrammetric Engineering & Remote Sensing, March 2006, pp. 213-216. This article discusses a technique for fillings voids in SRTM digital elevation data is that is intended to provide an improvement over traditional approaches, such as the Fill and Feather (F&F) method. In the F&F approach, a void is replaced with the most accurate digital elevation source ("fill") available with the void-specific perimeter bias removed. Then the interface is feathered into the SRTM, smoothing the transition to mitigate any abrupt change. It works optimally when the two surfaces are very close together and separated by only a bias with minimal topographic variance. The Delta Surface Fill (DSF) process replaces the void with fill source posts that are adjusted to the SRTM values found at the void interface. This process causes the fill to more closely emulate the original SRTM surface while still retaining the useful data the fill contains.

Despite the advantages such prior art approaches may provide in certain applications, further advancements may be desirable for error detection and correction in geospatial and other model data.

SUMMARY OF THE INVENTION

In view of the foregoing background, it is therefore an object of the present invention to provide a geospatial modeling system with enhanced feature rendering options and related methods.

This and other objects, features, and advantages are provided by a geospatial modeling system which may include a geospatial model data storage device, a user input device, and a display. Moreover, a processor may be included for cooperating with the geospatial model data storage device, the user input device and the display for displaying a geospatial model data set on the display including at least one group of building data points, and displaying a plurality of user-selectable different building shapes on the display based upon the at least one group of building data points. More particularly, the plurality of user-selectable different building shapes may have different respective feature detail levels. The processor may further replace the at least one group of building data points with a given one of the user-selectable different building shapes based upon user selection thereof with the user input device.

The processor may also update the geospatial model data based upon the user selection of the given one of the user-selectable different building shapes. The plurality of user-selectable different building shapes may include a generally rectangular building box as a lowest feature detail level, and/or a match of the at least one group of building data points as a highest feature detail level. Moreover, the plurality of user-selectable different building shapes may further include a plurality of user-selectable building shapes having respective different intermediate feature detail levels between the lowest and highest feature detail levels.

Additionally, the processor may further select the at least one group of building points for displaying from among a plurality of groups thereof based upon error calculations. By way of example, the error calculations may comprise at least one root mean square error (RMSE) calculation. Moreover, the error calculations may comprise two-dimensional and/or three-dimensional error calculation.

A geospatial modeling method aspect may include displaying a geospatial model data set on a display including at least one group of building data points, and displaying a plurality of user-selectable different building shapes on the display based upon the at least one group of building data points. The plurality of user-selectable different building shapes may have different respective feature detail levels. The method may further include replacing the at least one group of building data points with a given one of the user-selectable different building shapes based upon user selection thereof with a user input device.

A computer-readable medium is also provided which may have computer executable instructions for causing a computer to perform steps comprising displaying a geospatial model data set on a display including at least one group of building data points, and displaying a plurality of user-selectable different building shapes on the display based upon the at least one group of building data points. As noted above, the plurality of user-selectable different building shapes may have different respective feature detail levels. A further step may include replacing the at least one group of building data points with a given one of the user-selectable different building shapes based upon user selection thereof with a user input device.

BRIEF DESCRIPTION OF THE DRAWINGS

FIG. 15 is a comparison of screen prints for the DEN of FIG. 14 after fully automatic generation, and after being touched up through a manual/automated approach by the system of FIG. 13.

DETAILED DESCRIPTION OF THE PREFERRED EMBODIMENTS

Figure 1:
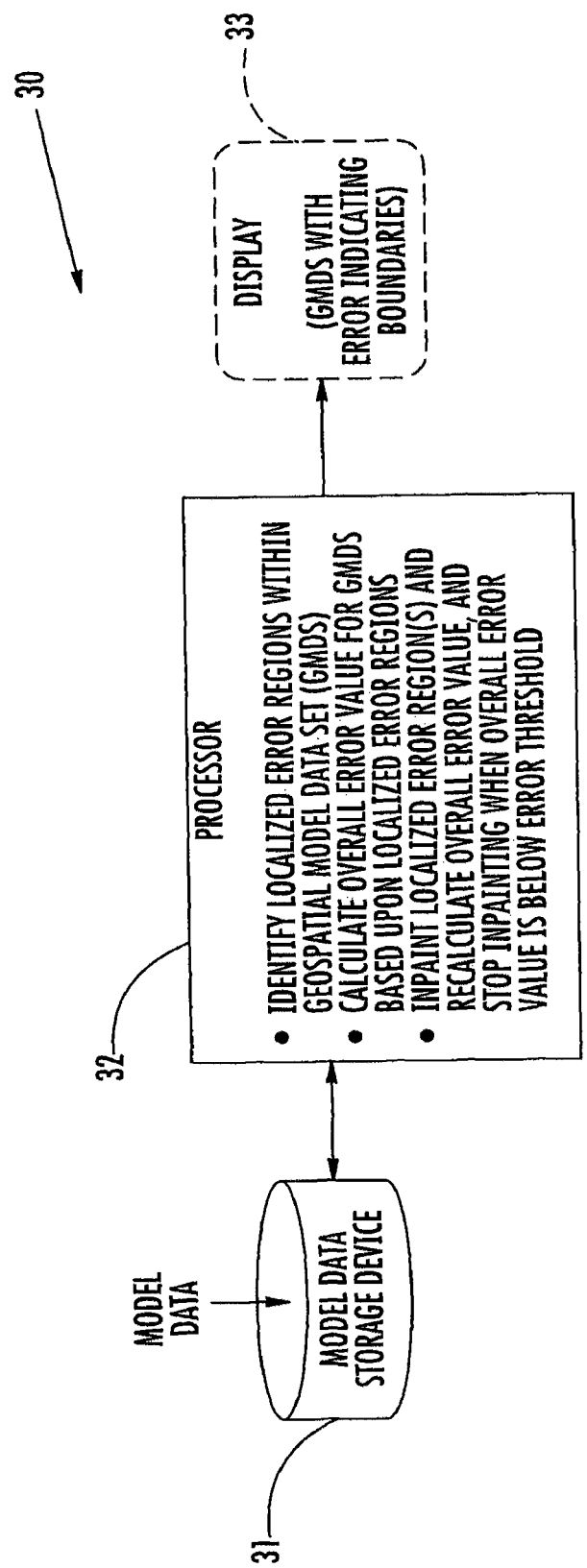
FIG. 1 is a schematic block diagram of a geospatial modeling system in accordance with one exemplary embodiment.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Referring initially to FIGS. 1-7, a geospatial modeling system 30 illustratively includes a geospatial model data storage device 31, a processor 32, and (optionally) a display 33. The geospatial model data storage device 31 stores geospatial model data, such as digital elevation model (DEN), digital surface model (DSM), and/or triangulated irregular network (TTIN) data, for example. Generally speaking, such model data is generated from "raw" data captures, such as LIDAR, synthetic aperture radar (SAR), photography, electro-optical, infrared, etc., using systems such as the above-noted Real-Site™ and LiteSite™ site modeling products, as will be appreciated by those skilled in the art. The geospatial model data set may be generated by another source and provided to the processor 32 for the additional processing operations to be described below, or the processor may generate the geospatial model data set in other embodiments.

By way of background, with typical prior art approaches, when automatically generating a 3D site model from a digital elevation model (DEM), for example, there is a usually a need for a manual (i.e., human operator) touch-up due to factors such as: noisy data; occlusion; boundary conditions (being partially cut off, etc.), algorithm limitations, etc. However, manual touch-up of site models, which can be very large, may be extremely time consuming. Moreover, locating the areas that require editing in large models may also be tedious and difficult.

The same issue presents itself in manual site model creation. Manual editing is a relatively long and expensive step in the production process, as a modeler (i.e., the user or operator) often has to render a model in 3D, locate the problem areas, find where these correlate to in 2D space, and then make the corrections in 2D image space. In particular, both manual model generation and manual touch-up of automated models typically rely upon images to produce a polygon. The polygon's height is obtained by calculation based upon cues in the image or relocating the polygon to another image. Location of the areas to be fixed is typically done completely by the modeler (i.e., "by eye"), and is dependent on his/her attention to detail. In other words, this introduces the possibility for user error.

As such, in both automated and manual processes, being able to find such problem areas in the model, and then having a relatively fast and effective approach to correct them with little or reduced operator effort may save a significant amount of time and cost. Therefore, in accordance with one aspect, the system 30 may advantageously perform enhanced error detection and correction operations.

Figure 2:
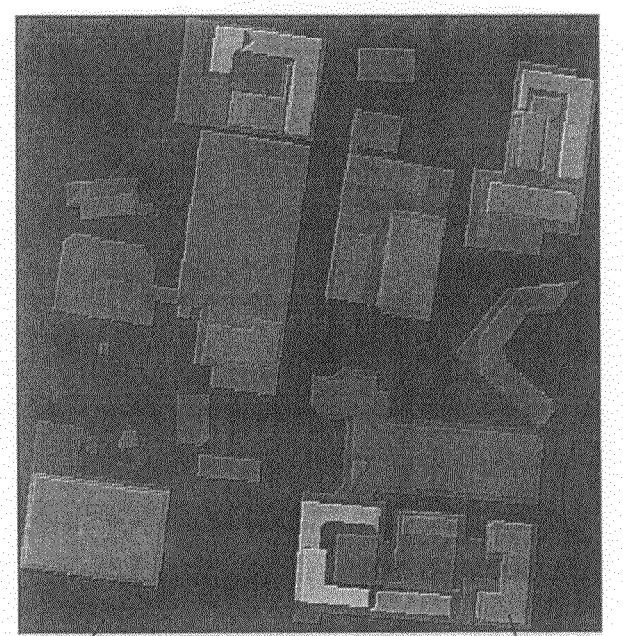
FIGS. 2 and 3 are a digital elevation model (DEM) and a corresponding error DEM for which the system of FIG. 1 performs error detection and correction.
Figure 3:
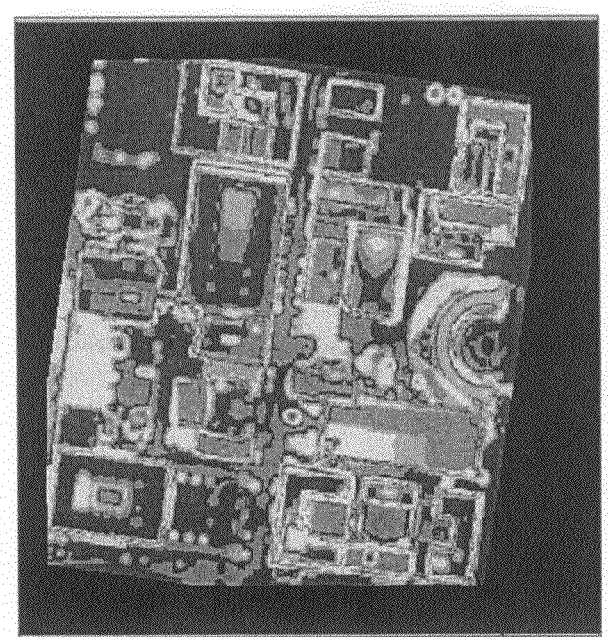
Figure 4:
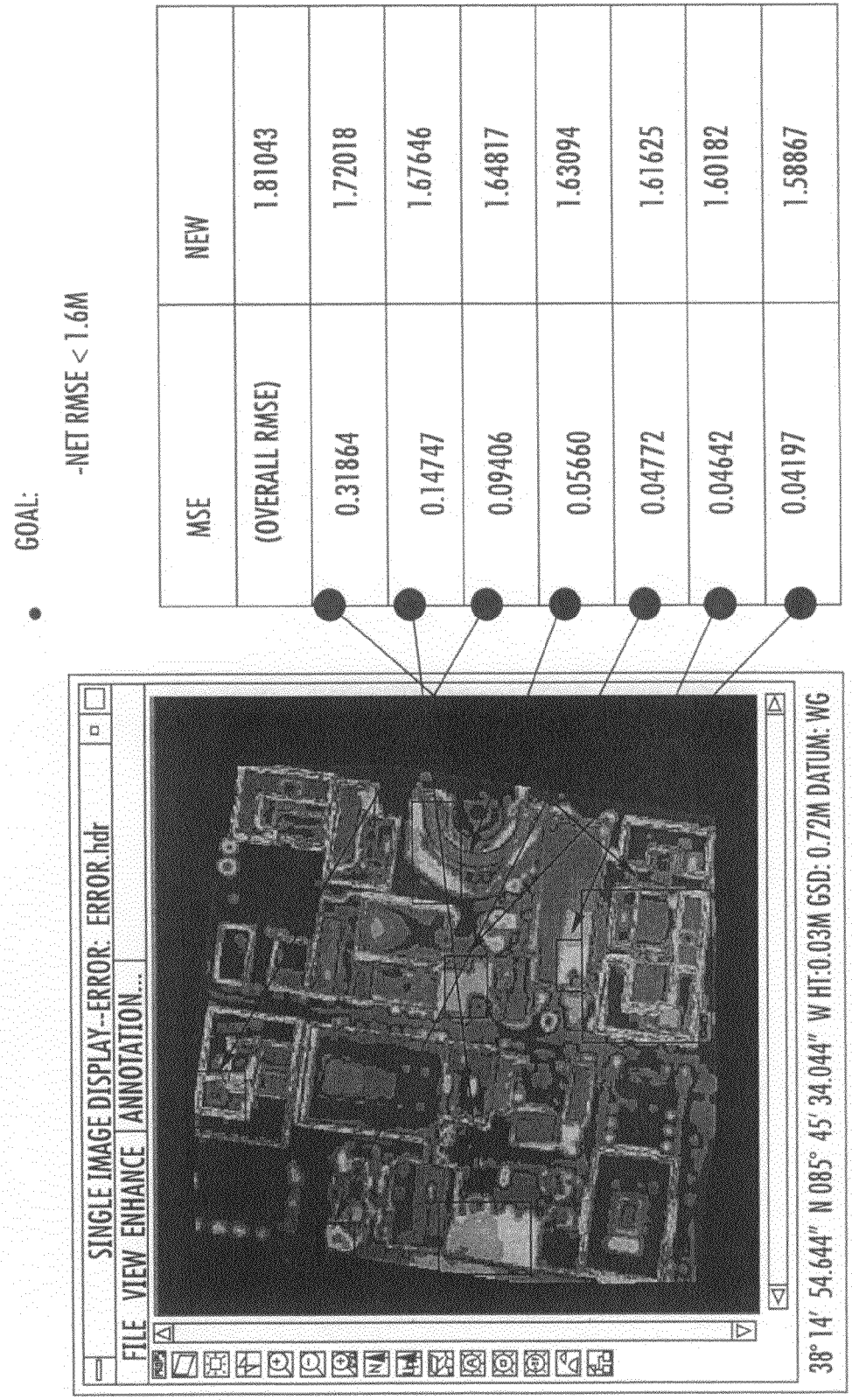
FIG. 4 is a screen print of the error DEM of FIG. 3 and an associated table identifying relative errors of localized error regions.

More particularly, beginning at Block 70, the processor 32 advantageously cooperates with the geospatial model data storage device 31 for identifying a plurality of localized error regions within a geospatial model data set, at Block 71, and calculates an overall error value for the DEM 40', at Block 72. An exemplary DEM 40 with errors therein is shown in FIG. 2. An alternative error view 40' of the DEM is shown in FIG. 3, and specific localized error regions 41' within the error DEM are shown in FIG. 4. That is, the processor 30 advantageously separates areas within the DEM 40 having a relatively high error value from areas having a relatively low error value to determine the localized-error regions 41'. By way of example, the error values of localized error regions 41' within the DEM 40, as well as the overall DEM error value, may be calculated using various approaches, including a total error, local root mean square error (RMSE), a maximum error, a mean square error (MSE), MSE relative to the overall DEM, RMSE relative to the overall DEM, etc., as will be appreciated by those skilled in the art.

$$MSE = \frac{\sum_{i=1}^{n}(e_i - a_i)^2}{n}$$

$$RMSE = \sqrt{MSE}$$

$$MSE_{Group} = \frac{\sum_{i=1, i \in Group}^{n}(e_i - a_i)^2}{n}$$

$$RMSE_{Fixed} = \sqrt{MSE_{DEM} - \sum_{Group \in Fixed} MSE_{Group}}$$

The processor 32 further inpaints one or more of the localized error regions 41' to repair or otherwise correct missing, obscured, etc., portions thereof, at Block 73. More particularly, this may be done by propagating contour data from outside a given localized error region 41' into the region, as will be appreciated by those skilled in the art. By way of example, this may be done using various approaches such as an inpainting algorithm, and, more particularly, fluid-flow modeling algorithms such as Navier-Stokes equations, etc.

Another approach is to perform exemplar inpainting, which involves "cutting" and "pasting" of patches from within the DEM 40 (or a different data set) to provide a best match for the corrupted or voided data, as will be appreciated by those skilled in the art. The inpainting may be done in an iterative fashion in some embodiments, as will also be appreciated by the skilled artisan. Further details regarding exemplary inpainting approaches which may be used are set forth in co-pending U.S. patent application Ser. Nos. 11/458,811 and 11/858,247, which are both assigned to the present Assignee and are hereby incorporated herein in their entireties by reference.

Figure 8:
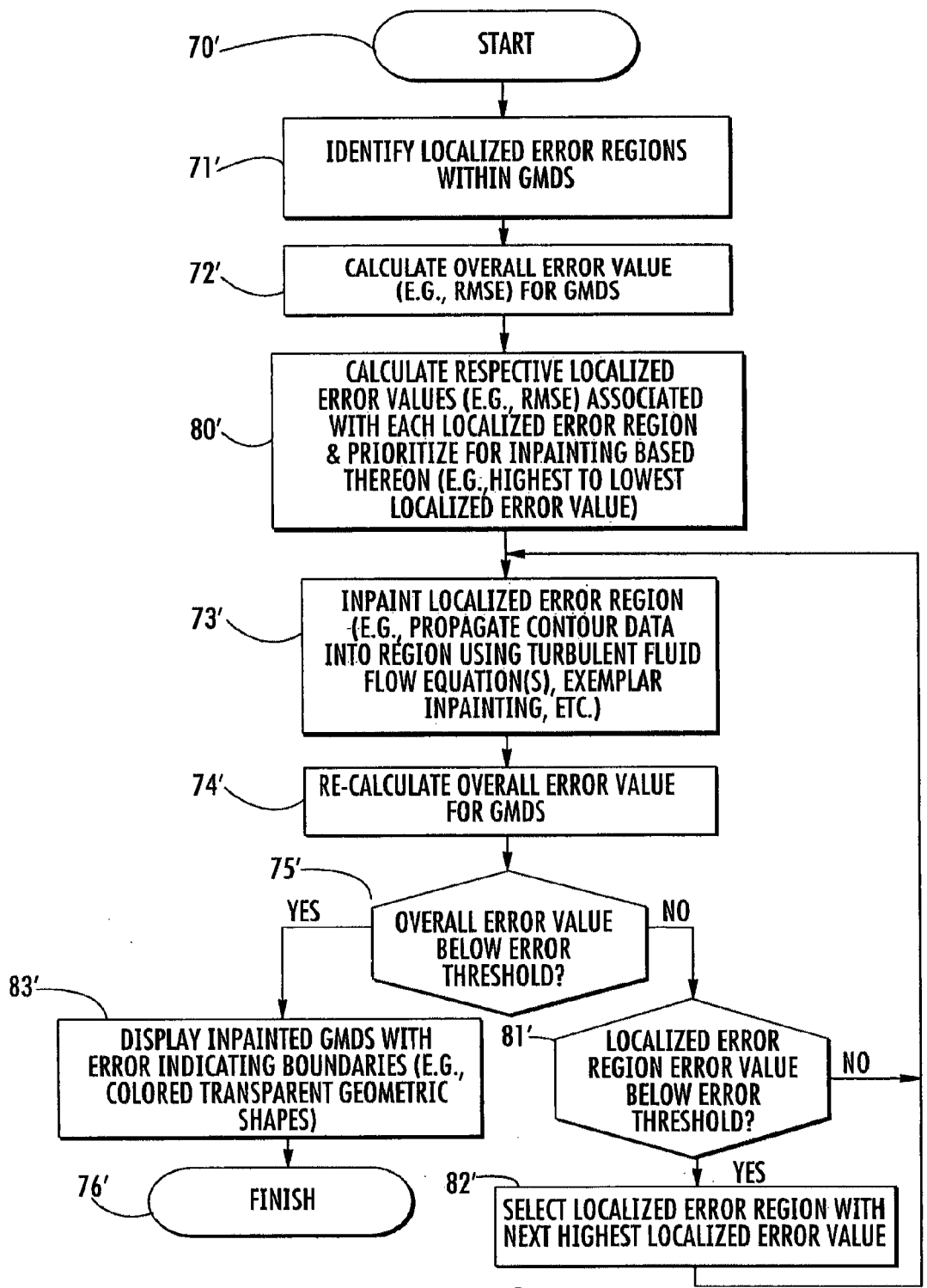
Figure 9:
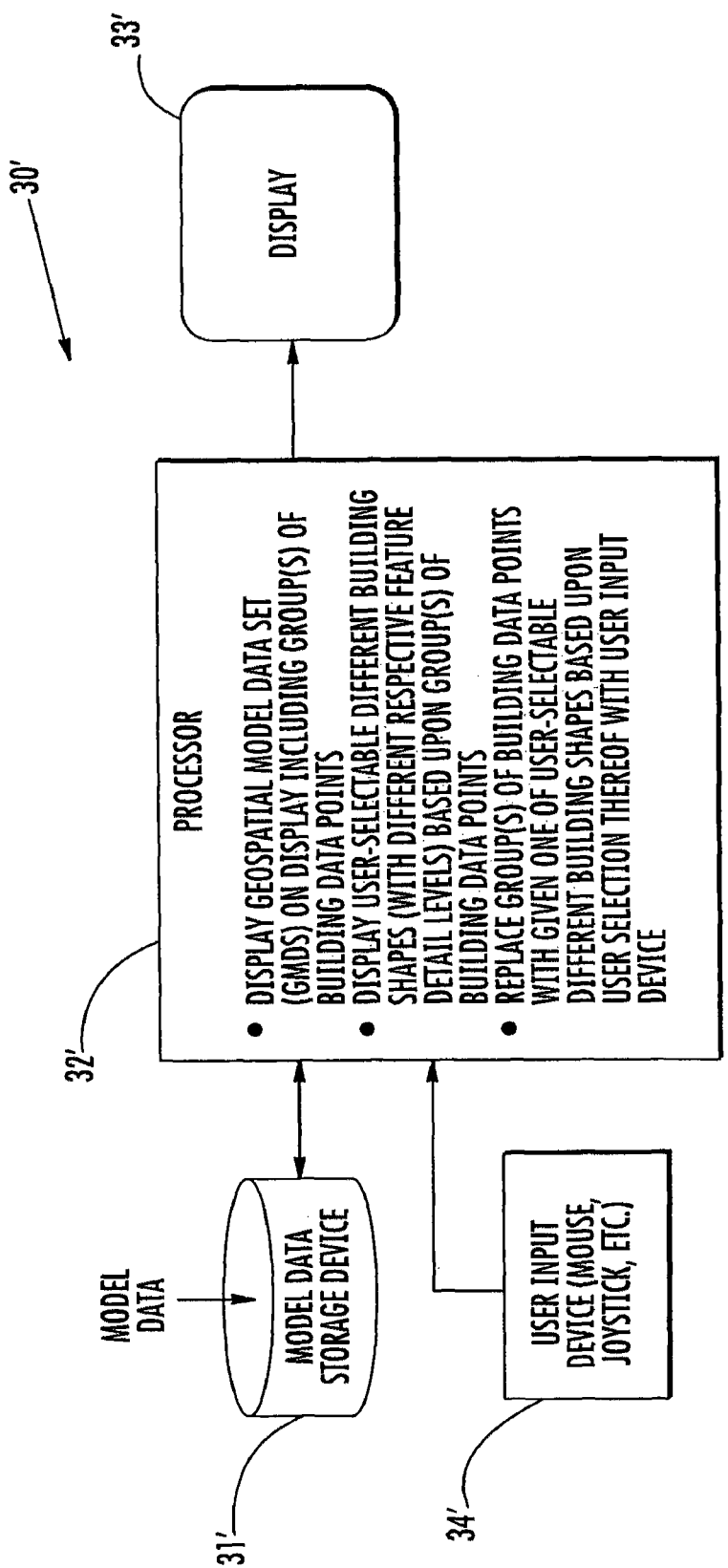
FIG. 9 is a schematic block diagram of an alternative embodiment of the system of FIG. 1 providing user-selectable building shape options.

The localized error region or regions 41' to be inpainted may be selected in various ways. In accordance with the exemplary embodiment illustrated in FIG. 8, the localized error regions 41, are prioritized for inpainting based upon their respective error values (Block 80'). That is, upon calculating the errors for the localized error regions 41', these regions are prioritized for inpainting based thereon. For example, the errors may be sorted by maximum error, relative error, etc., and the regions 41' are then selected for inpainting one at a time from a highest to a lowest error value, as will be appreciated by those skilled in the art. However, it should be noted that in other embodiments the order of regions 41' to be inpainted could be selected in a different order, or more than one region could be painted at a time.

The processor 32 re-calculates the overall error value for the DEM 40' after inpainting of the localized error region(s) 41' to determine if the overall error value is below an error threshold, at Blocks 74-75. If it is, then the processor 32 stops inpainting of the current localized error region 41', thus concluding the method illustrated in FIG. 7, at Block 76. Otherwise, the processor 32 returns to inpainting of the same or a different region 41' until the overall error value is brought below the error threshold.

In one exemplary embodiment where localized error regions are inpainted one at a time from highest to lowest error value, if upon re-calculation of the overall error value the overall error value is not below the error threshold, then the processor 32 determines whether the error value for the localized error region being inpainted is below an error threshold (which may be the same or a different threshold than the overall threshold), at Block 81'. If it is not, then the processor 32 returns to this same localized error region 41' for more inpainting operations. Otherwise, the processor 32 moves to the next localized error region 41' (i.e., the one with the next highest error value in line to be inpainted), at Block 82'.

The foregoing will be further understood with reference to the example illustrated in FIG. 4. Here, there are seven identified error regions 41' having error values ranging from 1.72018 m RMSE (highest) to 1.58867 m RMSE (lowest), and an overall error value for the error DEN 40' is 1.81043 m. The error threshold selected for this example is 1.6 m, but it should be noted that other error thresholds may be used in other embodiments as appropriate. Accordingly, the processor 32 will first select the localized error region 41' with the 1.72018 m RMSE error value for inpainting, and then inpaint this region until its error value of the DEM 41' is less than 1.6 m RMSE, or until the overall error value is less than 1.6 m RMSE. If the former occurs before the latter, the processor 32 moves along to inpaint the next error region 41' with the 1.67647 m RMSE, etc., until the overall error value of the error DEM 40' is less than 1.6 m RMSE.

Figure 5A:
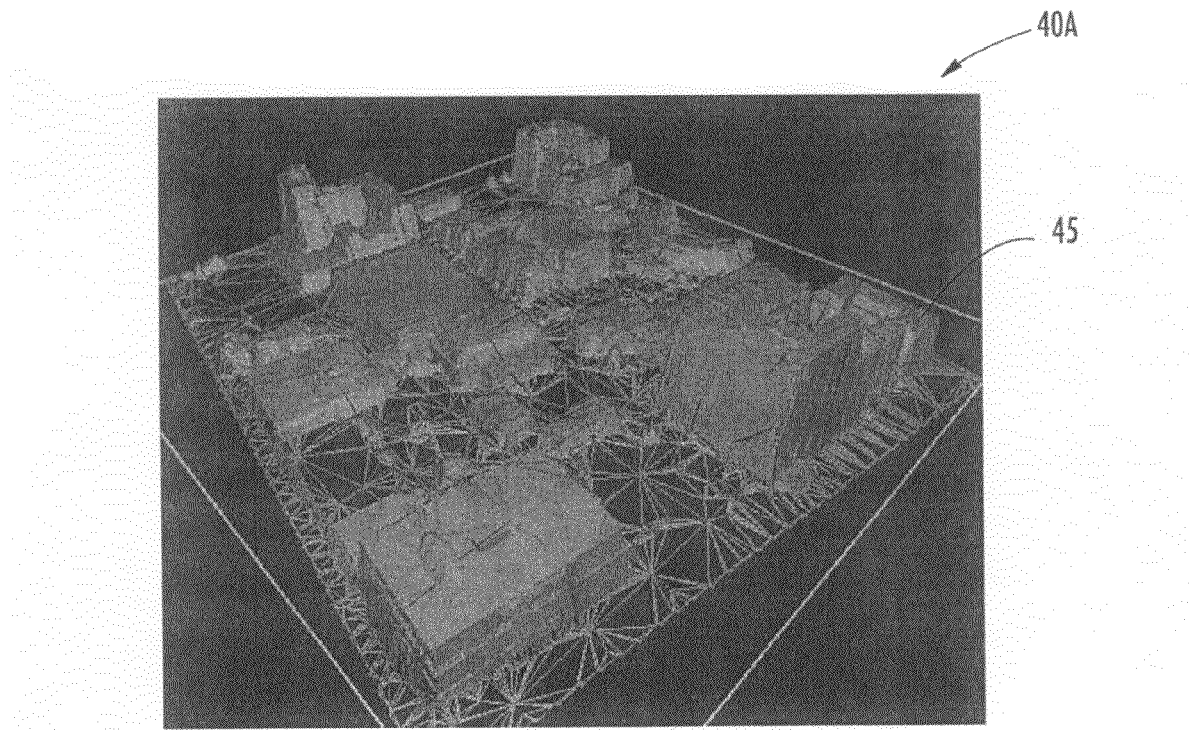
FIGS. 5A and 5B are triangulated irregular network (TIN) representations of the DEM of FIG. 2 with and without error indicating boundaries indicating localized error regions, respectively.
Figure 5B:
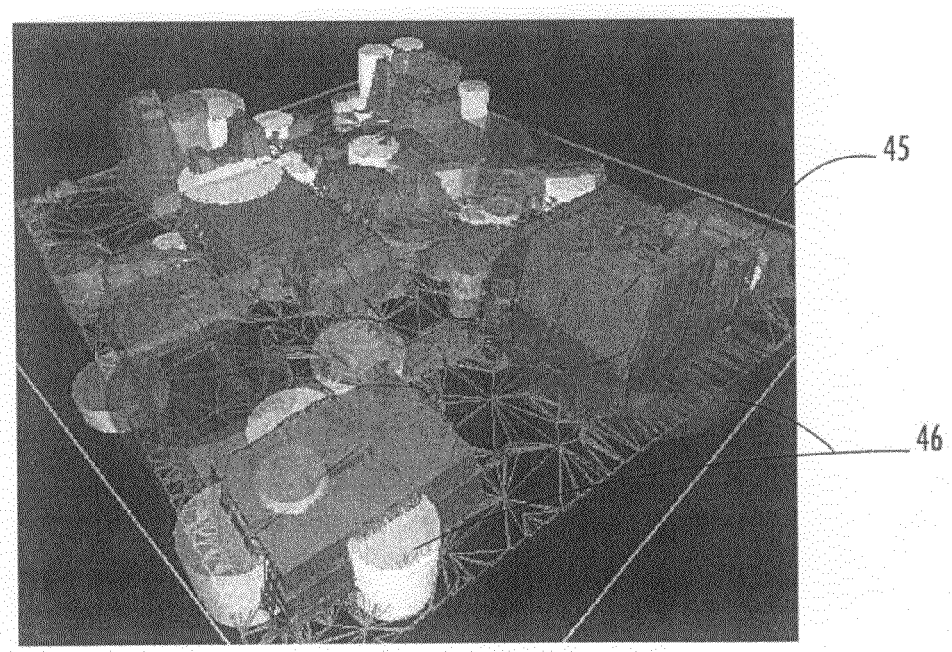
Figure 6A:
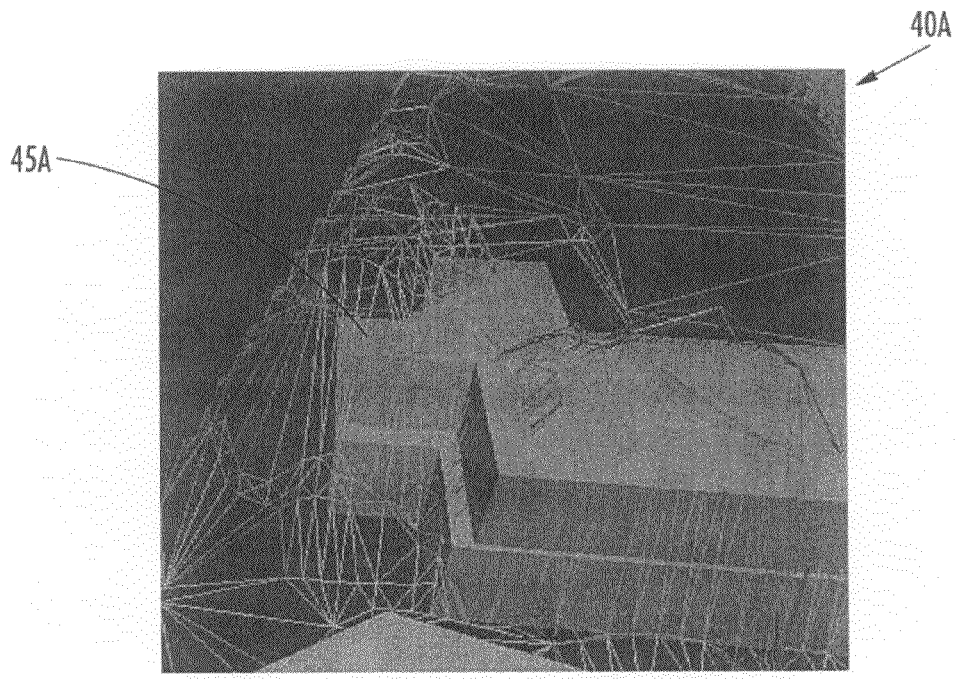
FIGS. 6A and 6B are more detailed views of a portion of the TINs of FIGS. 5A and 5B, respectively.
Figure 6B:
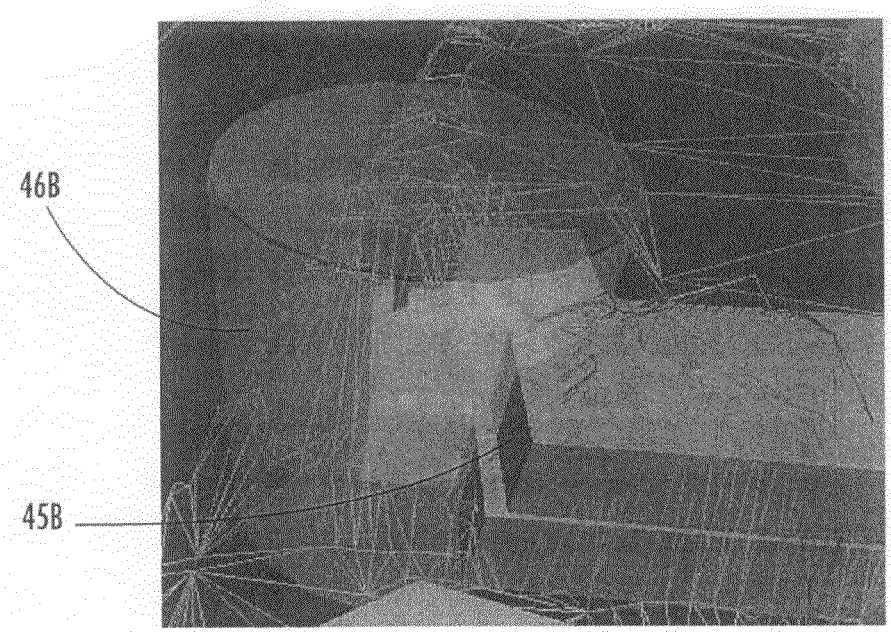
Figure 7:
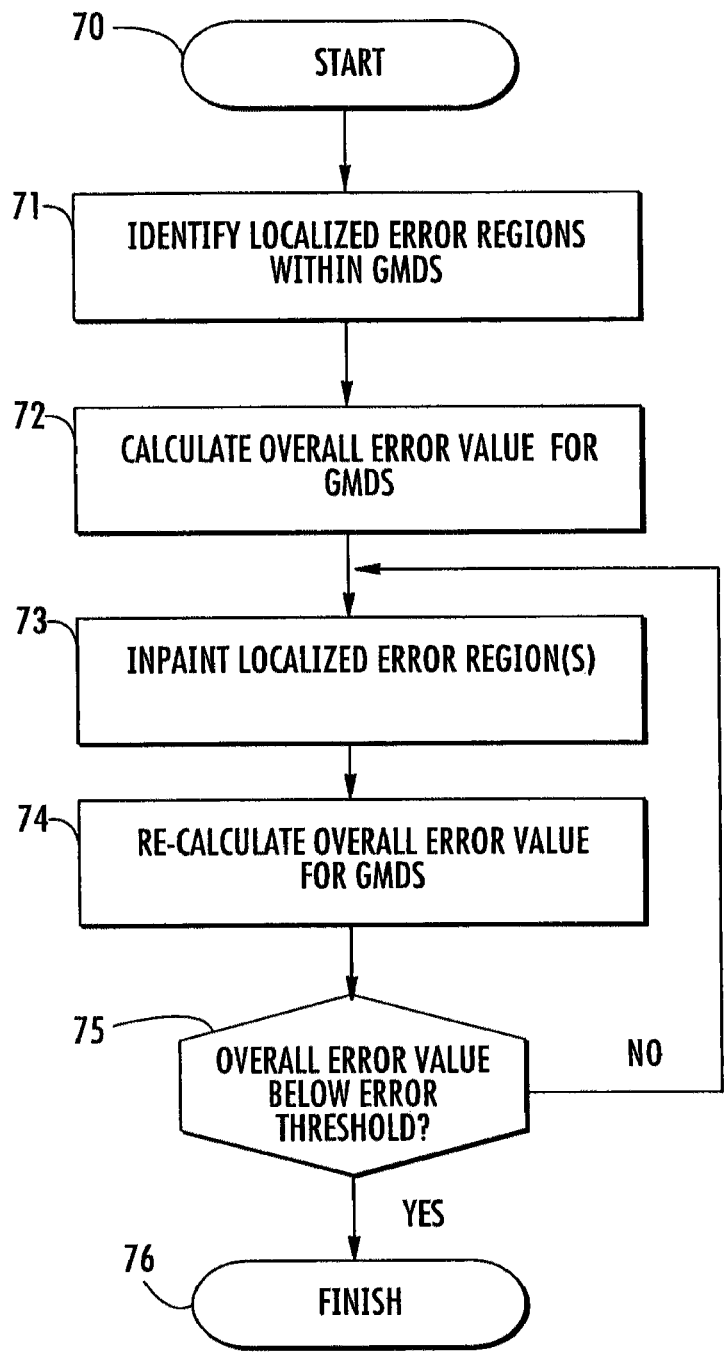
FIGS. 7 and 8 are flow diagrams illustrating a geospatial modeling method for identifying and inpainting localized error regions in geospatial model data.

Another particularly advantageous feature of the system 30 is that once the localized error regions 41' are selected, the processor 32 may optionally display the geospatial model data set along with error indicating boundaries 46 which identify errant buildings 45 or other objects/areas on the display 33, at Block 83', as seen in the TIN 40A of FIG. 5A (without boundaries), and TIN 40B of FIG. 5B (with boundaries). This allows a user to better visualize exactly which buildings 45, etc. are problem spots within the geospatial model data set. In the illustrated example, the error indicating boundaries 46 are geometric shapes. Moreover, these shapes are transparent or semi-transparent to allow the object with which the indicator is associated to still be seen therethrough. In the illustrated example, the geometric shapes are cylinders or semi-cylindrical shapes (i.e., partial cylinders), which provides a desirable visual contrast to generally rectangular buildings. However other shapes/indicators may also be used. The indicators 46 may also be colored in certain embodiments to indicate the severity of the error (e.g., red-orange-yellow-white to indicate highest to lowest error values).

Certain advantages of the above-described system 30 and method are that they provide automated model problem area location and prioritization. In some implementations, this approach may be fully automated with no manual (i.e., user) searching required for problem areas within a geospatial model data set. Moreover, the results may helpfully be prioritized by which areas should be addressed first.

In accordance with another aspect now described with reference to FIGS. 9-12, a system 30' and associated method for helping a user to more easily replace buildings 45 within localized error regions 41' of a geospatial model data set is now described. Beginning at Block 110, the processor 32' cooperates with the model data storage device 31' and display 33, to display geospatial model data including one or more groups of data points corresponding to a respective building 45, at Block 111. A given group of building data points may be selected for processing, such as by automatic selection of a group of points by the processor 32' or manual selection by a user with a user input device 34', which may be a mouse, joystick, keyboard, etc., as will be appreciated by those skilled in the art.

In one exemplary automated embodiment, a queue may be constructed using the above-described localized error region 41' error value prioritization (i.e., based upon error calculation) to create a queue for buildings that need to be corrected, at Block 120', and the processor 32' may take these in the order they are in the queue (e.g., from highest error value to lowest error value). The error calculations may be performed using the above-described approaches (e.g., RMSE, etc.), for example, as discussed further above. Moreover, these error calculations may also advantageously be performed on either 2D or 3D data sets, as will be appreciated by those skilled in the art. Alternatively, upon display of the error indicating boundaries/shapes 46, a user may manually select (with the user input device 34') a desired group of building data points to be corrected. Other suitable selection approaches may be used as well, as will be appreciated by those skilled in the art.

It should be noted that, as used herein, "3D" is meant to cover both true three-dimensional model data as well as so-called 2½ or 2.5D model data. More specifically, many DEMS or other geospatial model data sets are sometimes referred to as "2.5D" because they include rendered building walls, etc. that are not necessarily present in the original data capture, and thus do not provide a completely accurate 3D image as it would appear to the human eye upon viewing a scene. However, for clarity of discussed "3D" is meant to cover both cases herein.

For the selected group of building data points, the processor 32' then advantageously displays a plurality of different user-selectable building shapes 100a-100d (FIG. 10), at Block 112. That is, the processor 32' presents the user with a plurality of possible building shapes, so that the user can quickly select a shape that best fits the selected group of points. In particular, the plurality of user-selectable different building shapes 100a-100d have different respective feature detail levels associated therewith.

Generally speaking, the user decides which building shape 100a-100d to select based upon a tradeoff between visual resemblance and acceptable error for each building 45, which will depend upon the particular error parameters for a given geospatial model data set, as will be appreciated by those skilled in the art. Once a desired building shape has been selected by the user (i.e., with the user input device 34'), the processor 32' may then advantageously replace the given group of building data points with the selected building shape, at Block 113, and may update the data set accordingly (i.e., save the change in the model data storage device 31'), thus concluding the method illustrated in FIG. 11 (Block 114).

Figure 10:
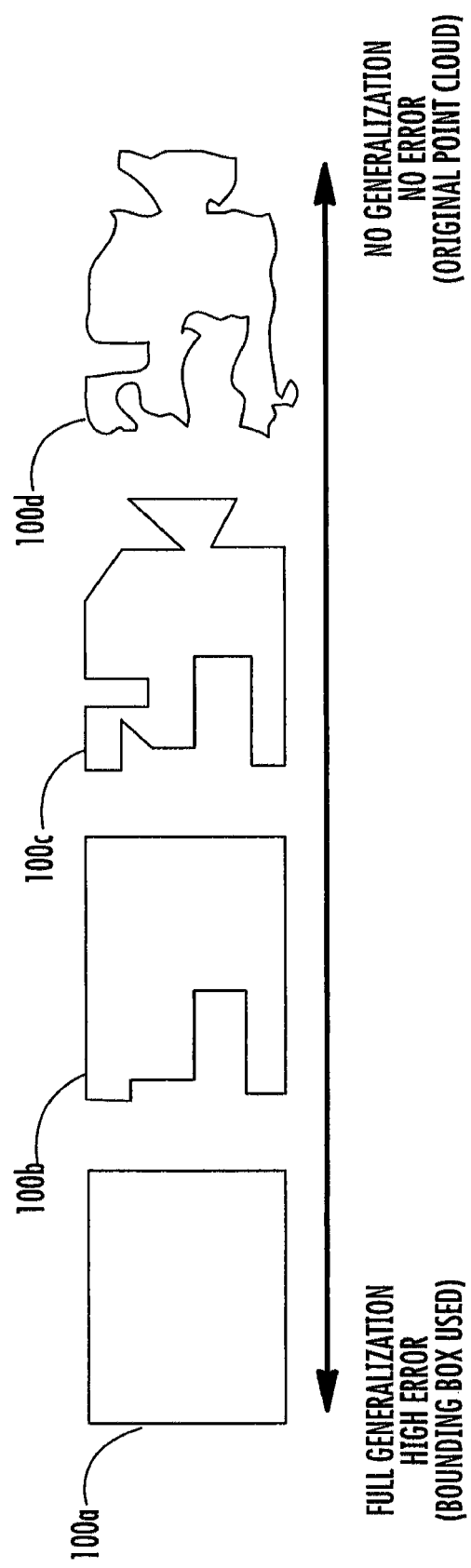
FIG. 10 is a series of building shapes displayed by the system of FIG. 9.
Figure 11:
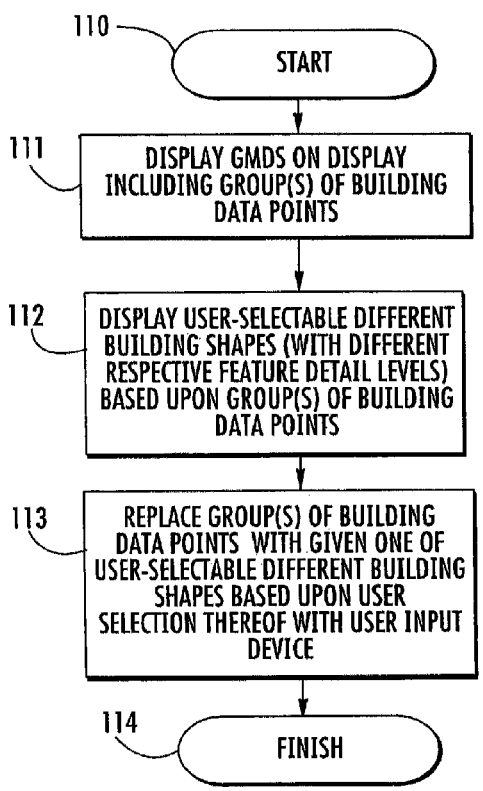
FIGS. 11 and 12 are flow diagrams illustrating an alternative geospatial modeling method for providing the user-selectable building shape options.
Figure 12:
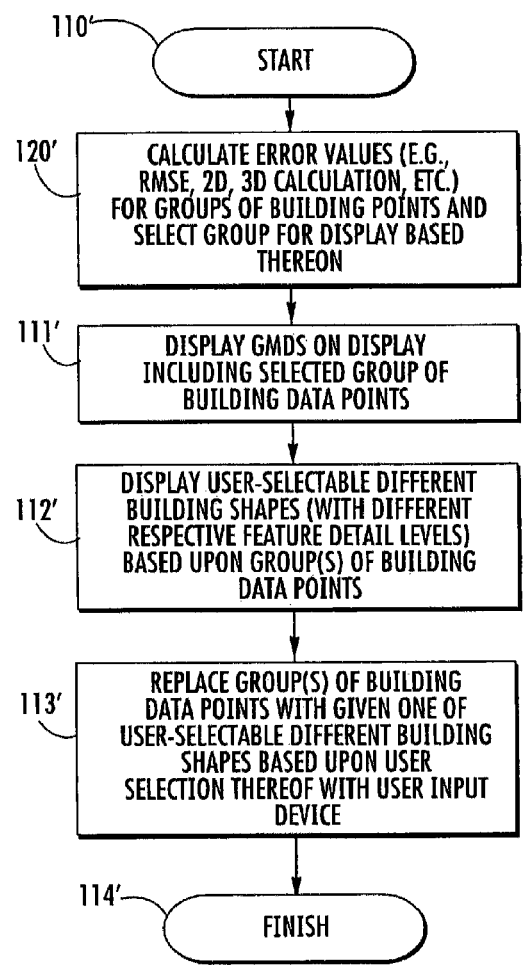
Figure 13:
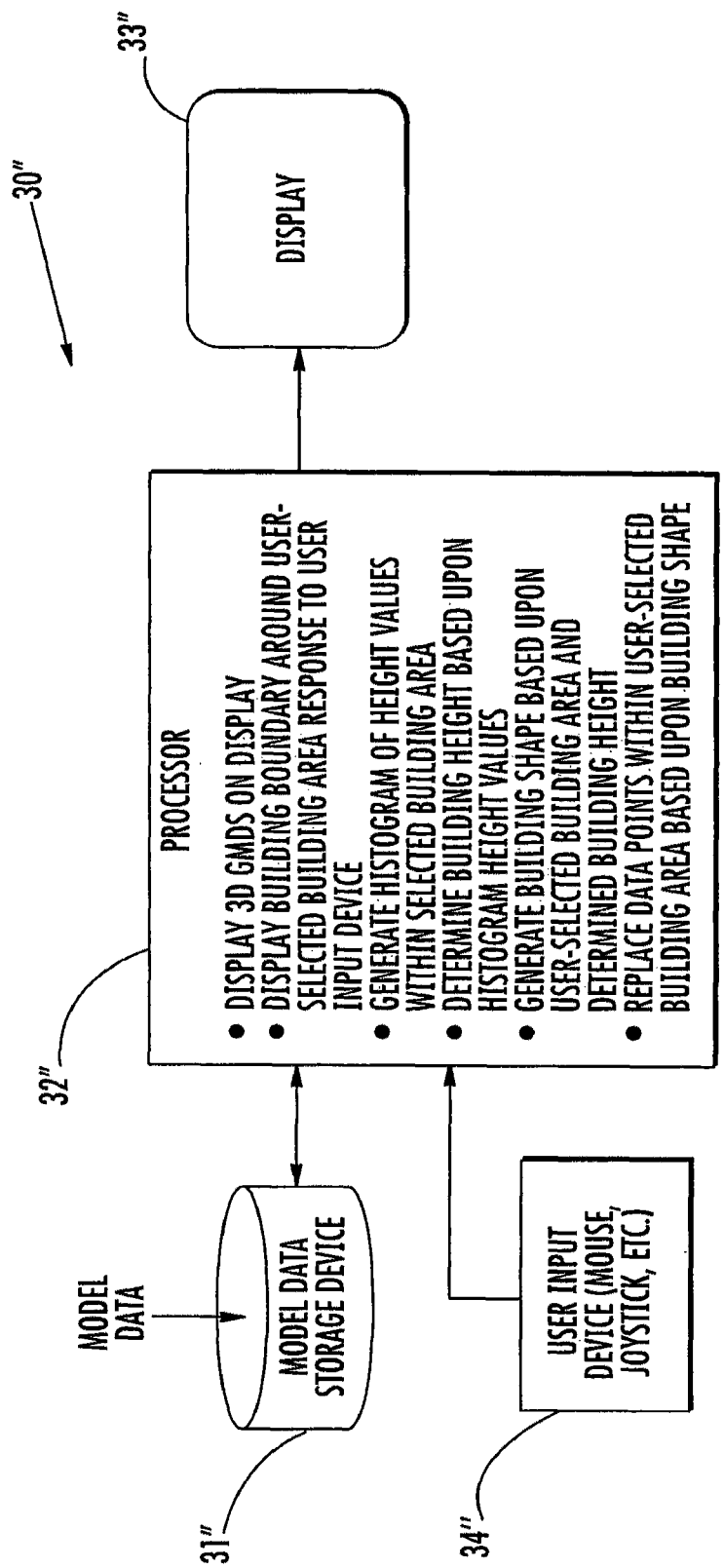
FIG. 13 is a schematic block diagram of yet another alternative embodiment of the system of FIG. 1 for generating building shapes based upon user-selected building areas and determined height values.
Figure 14:
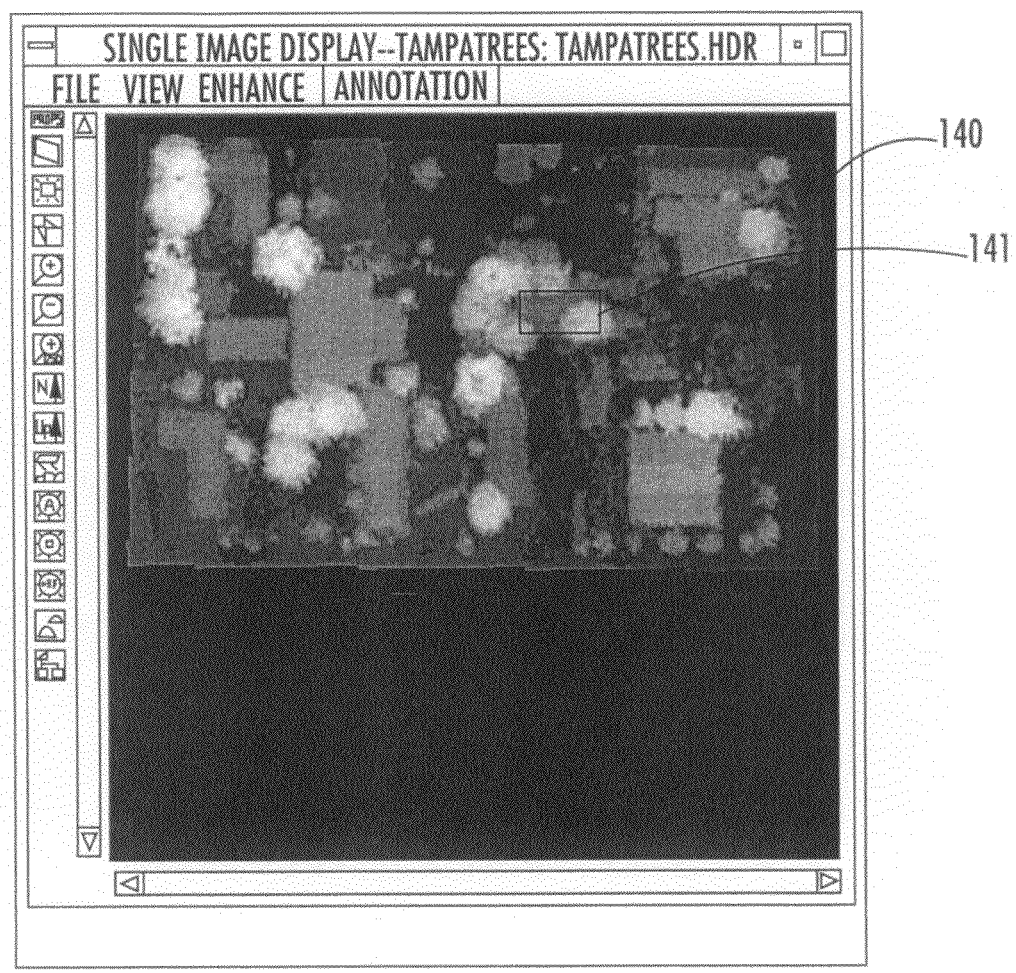
FIG. 14 is a screen print of a DEM with a building boundary area to be replaced with a generated building shape.

In the illustrated example, the shape with the least or lowest feature detail level (and, correspondingly, the highest error value associated therewith) is the generally rectangular building or "bounding" box 100a. On the other hand, the shape 100d has the highest feature detail level (i.e., the lowest error value), because it is a one-to-one match of the group of building data points. That is, the shape 100d includes all of the detail present in the original data set. The shapes 100b and 100c have varying levels of detail between the highest and lowest levels of the shapes 100a and 100d, respectively, as seen in FIG. 10.

The plurality of user-selectable building shapes 100a-100d may conceptually be considered as a "toolbox" of possible building shapes from which the user can quickly select a given shape to more accurately reflect the true or "real-life" shape of the actual building 45 being rendered in the model. This toolbox of shapes 100a-100d may be used in lieu of inpainting the building as described above. That is, using the above described approach, the processor 32' may select groups of building data points to be corrected in order based upon error values associated therewith, and then present the user with respective building shapes for each building to replace the errant groups of data points until the overall error of the geospatial model data set falls below the error threshold (or the localized error threshold falls below the error threshold). Of course, in other embodiments the user may just manually replace desired groups of building points without the use of error thresholds, if desired.

In addition, multiple levels of building shapes or toolboxes may be presented to the user. For example, the user may be presented with the first set of four building shapes 100a-100d, and based upon the selected shape the processor 32' may provide another set of four shapes with detail levels (or error values) closer to the first selected shape, etc. Thus, the user can "drill-down" through a plurality of shape levels to obtain a most desired match. Moreover, through each successive level of potential shapes, the processor 32' may add further details or features to the shapes, such as roof pitches, etc. This may advantageously help conserve processing time, since the processor 32' does not have to generate multiple shapes along a large spectrum of possible error values, but rather can quickly focus in on a narrower error range of interest to the user and only generate building shapes within this range, as will be appreciated by those skilled in the art.

Certain advantages of the system 30' and associated methods are that they provide automated problem resolution, including a relatively full range of automatically created options (i.e., user-selectable building shapes) that are presented to a user on screen, ranging from the building box 100a all the way to the original point cloud 100d. Moreover, this approach may advantageously allow users to make customized solutions "on the fly" based on user requirements.

Turning additionally to FIGS. 13-17, another advantageous geospatial modeling system 30" and related method aspect are now described which allow a user to relatively quickly and easily perform manual error correction on a 3D model, rather than having to translate over to 2D image space. By way of example, the following approach may be used in combination with the above-described methods such that if a localized error region cannot be inpainted to the point where its error value is below the error threshold, or a suitable building shape cannot be presented for the user, the user can "manually" correct an errant object, such as a building. It should be noted that reference herein to a "building" is meant to include a wide range of man-made structures (e.g., houses, stadiums, arenas, storage tanks, bridges, etc.), and not just high-rise building structures, although "building" is used throughout for simplicity and clarity of reference.

More particularly, beginning at Block 170, in the present embodiment the processor 32" cooperates with the geospatial model data storage device 31", the user input device 34", and the display 33" for displaying a 3D geospatial model data set on the display, at Block 171. Moreover, a building boundary 141 is displayed around a user-selected building area in a DEM 140 responsive to the user input device 34" (Block 172), and a histogram of height values within the selected building area is generated, at Block 173. In the present example, the DEM 140 is "raw" in that no error correction has yet been performed thereto.

The processor 32" may then advantageously determine a building height based upon the histogram of height values, at Block 174. By way of example, the building height may be based upon a peak histogram value. More particularly, the building height may be chosen as the center of a first or predominant height cluster (starting from a minimum value of the histogram) that meets a predetermined set of statistical criteria. This approach may advantageously select a building height with less susceptibility to error from noisy edge posts for data collection points around the edges of buildings, for example, as will be appreciated by those skilled in the art.

Once the building height is determined, a building shape is then generated based upon the user-selected building area 141 and the determined building height, at Block 175, and data points within the user-selected building area are replaced based upon the building shape, at Block 176, thus concluding the illustrated method (Block 177). That is, the processor 32" renders a new building shape having the outline of the user-selected building area 141 and the determined building height.

In FIG. 15, the DEM 140' is first shown (left-hand side of drawing) after the original input was run through the LiteSite® Automated Building Vector process. The DEM 140' includes areas with short buildings, boundary conditions/errors, occlusions, and noise, for example.

Figure 16A:
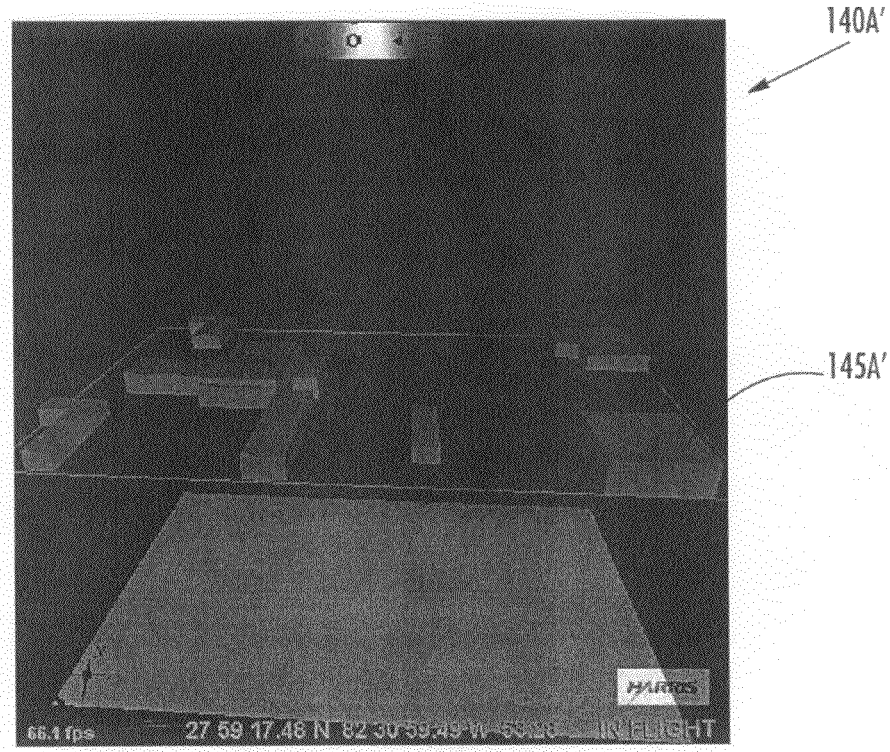
FIGS. 16A and 16B are 3D display views of the DEMs of FIG. 15 for the fully automatic and the touched-up versions, respectively.
Figure 16B:
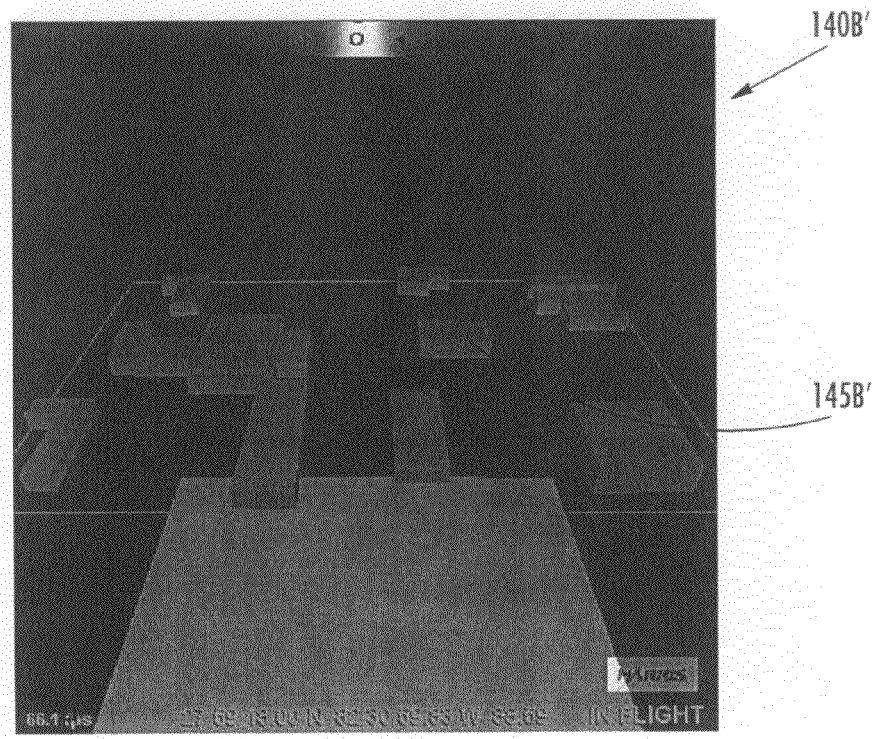
Figure 17:
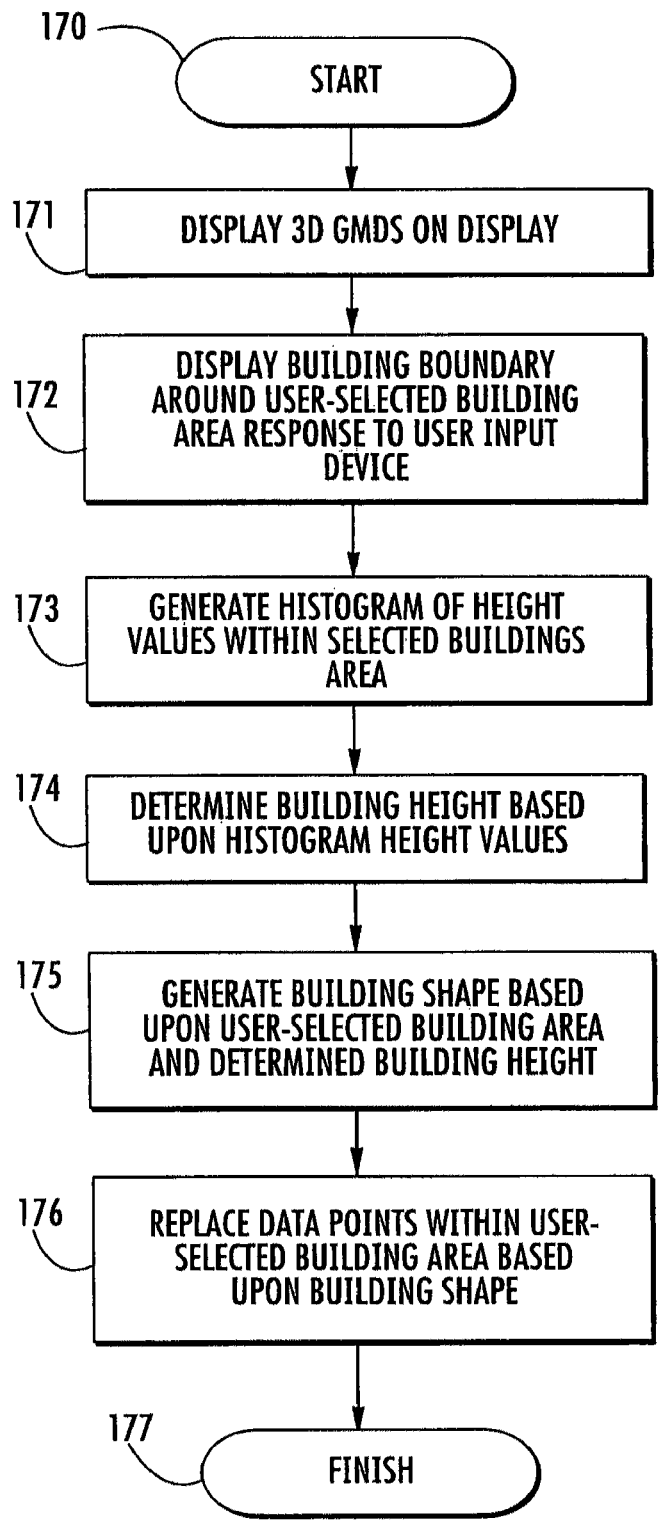
FIG. 17 is a flow diagram of another alternative embodiment of a geospatial modeling method for generating building shapes based upon user-selected building areas and determined height values.

By way of comparison, a manually touched-up version of the DEM 140" using the above-noted approach is shown on the right-hand side of FIG. 15. This corrected DEM 140" took approximately two minutes of user time to perform the error correction operations shown (by a trained operator), above the requisite processing (i.e., CPU) time. However, this CPU processing time is relatively insignificant compared to the processing time required for the fully automated error correction. FIGS. 16A and 16B are corresponding simulated 3D views 140A' and 140B' of the automatically corrected DEM 140' and manually corrected DEM 140" of FIG. 15, respectively. As seen in the simulated views, the manual touch-up results in the generation of buildings 145B' not included in the fully automated DEM 140' (i.e., in addition to buildings 145A' present therein).

Depending upon a given implementation and the particular error/accuracy requirements for a particular geospatial model data set, it may be acceptable to simply use a fully automated approach to error correction, as this provides significant improvement over the basic uncorrected DEM 140. However, where further accuracy is required, the above-described 3D manual error correction approach (which is referred to herein as "manual" because it requires some user involvement to draw the user-selected building area 141, although the remainder of the process may in fact be automated) may advantageously be used in place of, or as a supplement to, fully automated error correction. It is noteworthy that the above-described manual approach is much less time consuming than typical current manual model editing tools, which require translation or re-location to corresponding 2D views, user guessing of building height values, etc., which can be very time consuming for the user.

Accordingly, the system 30" and associated methods may advantageously allow for drawing directly on a DEM, etc., as an additional quality control option. This approach does not require user involvement to obtain the height of a manually drawn building, i.e., the processor 32" advantageously does this for the user in an automated fashion based upon the user-selected building area 141. As such, time-consuming relocation to 2D images need not be performed, as with many prior art image-based error correction techniques. Moreover, since problem areas may be corrected directly on the displayed 3D DEM or other 3D data model, additional satellite or aerial reference imagery need not be required, which can provide additional time and cost savings.

Other advantages of the above-described systems and methods may include: savings of time and cost in the quality control phase of 3D modeling production; making automated 3D model creation more flexible and verifiable to a given set of model requirements; potentially decreasing the chance of sending out a final product with a problem area overlooked; and decreasing re-work of generated models.

The above-noted geospatial model method, aspects may also be embodied in a computer-readable medium having computer-executable instructions for causing a computer to perform the steps set forth above, as will be appreciated by those skilled in the art.

Additional features of the invention may be found in co-pending applications entitled GEOSPATIAL MODELING SYSTEM PROVIDING INPAINTING AND ERROR CALCULATION FEATURES AND RELATED METHODS, Ser. No. 11/863,377; and GEOSPATIAL MODELING SYSTEM PROVIDING BUILDING GENERATION BASED UPON USER INPUT ON 3D MODEL AND RELATED METHODS, Ser. No. 11/863,417, the entire disclosures of which are hereby incorporated herein by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A geospatial modeling system comprising:
a geospatial model data storage device;
a user input device;
a display; and
a processor cooperating with said geospatial model data storage device, said user input device and said display and configured to
display a geospatial model data set on said display including at least one group of building data points,
display a plurality of user-selectable different building shapes on said display based upon the at least one group of building data points, the plurality of user-selectable different building shapes having different respective feature detail levels, and each feature detail level having a different respective error value associated therewith, and
replace the at least one group of building data points with a given one of the user-selectable different building shapes based upon user selection thereof with said user input device.

2. The geospatial modeling system of claim 1 wherein said processor is further configured to update the geospatial model data based upon the user selection of the given one of the user-selectable different building shapes.

3. The geospatial modeling system of claim 1 wherein the plurality of user-selectable different building shapes comprises a generally rectangular building box as a lowest feature detail level.

4. The geospatial modeling system of claim 1 wherein the plurality of user-selectable different building shapes comprises a match of the at least one group of building data points as a highest feature detail level.

5. The geospatial modeling system of claim 4 wherein the plurality of user-selectable different building shapes further comprises a generally rectangular building box as a lowest feature detail level, and a plurality of user-selectable building shapes having respective different intermediate feature detail levels between the lowest and highest feature detail levels.

6. The geospatial modeling system of claim 1 wherein said processor is further configured to select for displaying the at least one group of building points from among a plurality of groups thereof based upon error calculations.

7. The geospatial modeling system of claim 6 wherein the error calculations comprise at least one root mean square error (RMSE) calculation.

8. The geospatial modeling system of claim 6 wherein the error calculations comprise at least two-dimensional error calculation.

9. The geospatial modeling system of claim 6 wherein the error calculations comprise at least three-dimensional error calculation.

10. A geospatial modeling system comprising:
a geospatial model data storage device;
a user input device;
a display; and
a processor cooperating with said geospatial model data storage device, said user input device and said display and configured to
display a geospatial model data set on said display including at least one group of building data points,
display a plurality of user-selectable different building shapes on said display based upon the at least one group of building data points, the plurality of user-selectable different building shapes comprising a match of the at least one group of building data points as a highest feature detail level, a generally rectangular building box as a lowest feature detail level, and a plurality of user-selectable building shapes having respective different intermediate feature detail levels between the lowest and highest feature detail levels, and each feature detail level having a different respective error value associated therewith,
replace the at least one group of building data points with a given one of the user-selectable different building shapes based upon user selection thereof with said user input device, and
update the geospatial model data based upon the user selection of the given one of the user-selectable different building shapes.

11. The geospatial modeling system of claim 10 wherein said processor is further configured to select for displaying the at least one group of building points from among a plurality of groups thereof based upon error calculations.

12. The geospatial modeling system of claim 11 wherein the error calculations comprise at least one root mean square error (RMSE) calculation.

13. A geospatial modeling method comprising:
using a processor to display a geospatial model data set on a display including at least one group of building data points;
using a processor to display a plurality of user-selectable different building shapes on the display based upon the at least one group of building data points, the plurality of user-selectable different building shapes having different respective feature detail levels, and each feature detail level having a different respective error value associated therewith; and
using a processor to replace the at least one group of building data points with a given one of the user-selectable different building shapes based upon user selection thereof with a user input device.

14. The geospatial modeling method of claim 13 further comprising using the processor to update the geospatial model data based upon the user selection of the given one of the user-selectable different building shapes.

15. The geospatial modeling method of claim 13 wherein the plurality of user-selectable different building shapes comprises a generally rectangular building box as a lowest feature detail level.

16. The geospatial modeling method of claim 13 wherein the plurality of user-selectable different building shapes comprises a match of the at least one group of building data points as a highest feature detail level.

17. The geospatial modeling method of claim 16 wherein the plurality of user-selectable different building shapes further comprises a generally rectangular building box as a lowest feature detail level, and a plurality of user-selectable building shapes having respective different intermediate feature detail levels between the lowest and highest feature detail levels.

18. The geospatial modeling method of claim 13 further comprising using the processor to select the at least one group of building points for displaying from among a plurality of groups thereof based upon error calculations.

19. A non-transitory computer-readable medium having computer executable instructions for causing a computer to perform steps comprising:
   displaying a geospatial model data set on a display including at least one group of building data points;
   displaying a plurality of user-selectable different building shapes on the display based upon the at least one group of building data points, the plurality of user-selectable different building shapes having different respective feature detail levels, and each feature detail level having a different respective error value associated therewith; and
   replacing the at least one group of building data points with a given one of the user-selectable different building shapes based upon user selection thereof with a user input device.

20. The non-transitory computer-readable medium of claim 19 further having computer-executable instructions for causing the computer to perform a step of updating the geospatial model data based upon the user selection of the given one of the user-selectable different building shapes.

21. The non-transitory computer-readable medium of claim 19 wherein the plurality of user-selectable different building shapes comprises a generally rectangular building box as a lowest feature detail level.

22. The non-transitory computer-readable medium of claim 19 wherein the plurality of user-selectable different building shapes comprises a match of the at least one group of building data points as a highest feature detail level.

23. The non-transitory computer-readable medium of claim 22 wherein the plurality of user-selectable different building shapes further comprises a generally rectangular building box as a lowest feature detail level, and a plurality of user-selectable building shapes having respective different intermediate feature detail levels between the lowest and highest feature detail levels.

24. The non-transitory computer-readable medium of claim 19 further having computer-executable instructions for causing the computer to perform a step of selecting the at least one group of building points for displaying from among a plurality of groups thereof based upon error calculations.

* * * * *